United States Patent [19]

Michaelson

[11] Patent Number: 5,086,084
[45] Date of Patent: Feb. 4, 1992

[54] POLYVINYL CHLORIDE/POLYURETHANE HYBRID FOAMS

[75] Inventor: William Michaelson, Cerritos, Calif.

[73] Assignee: Lee H. Ambrose, Aspen, Colo.

[21] Appl. No.: 512,064

[22] Filed: Apr. 18, 1990

Related U.S. Application Data

[63] Continuation of Ser. No. 399,851, Aug. 29, 1989, abandoned, which is a continuation of Ser. No. 300,787, Jan. 23, 1989, abandoned.

[51] Int. Cl.[5] ............................................. C08L 75/00
[52] U.S. Cl. ................................. 521/137; 521/908
[58] Field of Search ............................ 521/137, 908

[56] References Cited

U.S. PATENT DOCUMENTS

| | | | |
|---|---|---|---|
| 2,898,312 | 8/1959 | Szukiewicz | 260/2.5 |
| 3,257,754 | 6/1966 | Ohsol | 47/56 |
| 3,644,229 | 2/1972 | Butler et al. | 260/2.5 AD |
| 3,729,370 | 4/1973 | Cobbledick | 161/160 |
| 3,876,571 | 4/1975 | Cobbledick et al. | 521/137 |
| 3,884,849 | 5/1975 | Molbert | 521/137 |
| 3,925,506 | 12/1975 | Jin et al. | 260/836 |
| 3,931,062 | 1/1976 | Cobbledick | 521/137 |
| 3,931,450 | 1/1976 | Patton, Jr. et al. | 428/315 |
| 3,978,011 | 8/1976 | Molbert | 521/137 |
| 4,018,724 | 4/1977 | Cobbledick | 521/123 |
| 4,022,856 | 5/1977 | Maxey | 521/137 |
| 4,140,667 | 2/1979 | Preston et al. | 260/33.2 R |
| 4,278,770 | 7/1981 | Chandalia | 521/137 |
| 4,305,991 | 12/1981 | Meyborg et al. | 428/318.8 |
| 4,327,194 | 4/1982 | Chandalia et al. | 521/137 |
| 4,338,407 | 7/1982 | Chandalia et al. | 521/137 |
| 4,389,454 | 6/1983 | Horacek et al. | 428/318.6 |
| 4,438,221 | 3/1984 | Fracalossi et al. | 521/137 |
| 4,539,378 | 9/1985 | Cuscurida et al. | 525/407 |
| 4,576,970 | 3/1986 | Ganster et al. | 521/51 |
| 4,618,629 | 10/1986 | Buchanan | 521/137 |
| 4,701,473 | 10/1987 | Hasegawa et al. | 521/118 |

*Primary Examiner*—Morton Foelak
*Attorney, Agent, or Firm*—Testa, Hurwitz & Thibeault

[57] ABSTRACT

Disclosed is a foamed polymeric material comprising a continuous phase of polyurethane having solid polyvinyl chloride particles dispersed therein. The material preferably comprises about 100 parts of a foamable urethane, and 10 to 50 parts polyvinyl chloride particles having a particle size below 200 microns. The material has a microcellular structure with cells preferably on the order of 0.1 mm in average diameter or less. The walls comprise a matrix of polyurethane reinforced with PVC particles. The material may be used as a wood substitute.

21 Claims, 1 Drawing Sheet

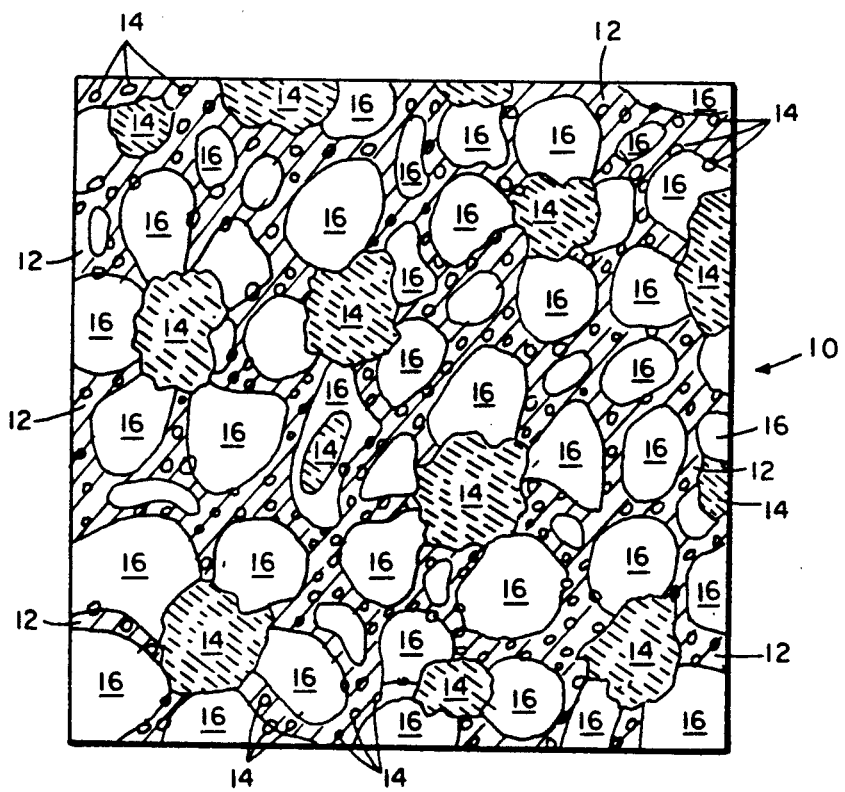

POLYVINYL CHLORIDE/POLYURETHANE HYBRID FOAMS

This application is a continuation of application Ser. No. 199,851, filed Aug. 29, 1989, now abandoned, which is a continuation of application Ser. No. 300,787, filed Jan. 23, 1989, now abandoned.

BACKGROUND OF THE INVENTION

This invention relates to the manufacture of structural elements from synthetic polymers. More particularly, the invention relates to polyurethane foams reinforced with polyvinyl chloride particles to produce molded shapes which simulate many of the structural properties of wood.

Foamed polymeric materials are produced from a variety of thermoplastic and thermosetting resins by expansion of the polymeric composition during molding, or polymerization in the presence of a blowing agent. Density control is achieved by varying the quantity and type of blowing agent. Rigid and flexible foams of various densities are known and widely available. They are used, for example, for cushioning, thermal and electrical insulation, and structural applications.

Polyurethane foams are produced by condensation of a multifunctional isocyanate and a hydroxyl-containing material, i.e., a polyol. Typically, a polyether or polyester based polyol is reacted with a polyisocyanate in the presence of a catalyst and a blowing agent such as water. The resulting foam may have a density from 0.5 to 50 pounds per cubic foot, (approximately 8 to 800 kilograms per cubic meter), and very low thermal conductivity. These properties, in conjunction with the ready availability and relative low cost of the reactants, make polyurethane foams ideal for use in soft furniture, insulation, automotive and construction components, cushioning, and in other settings.

Polyvinyl chloride is produced by Polymerizing vinyl chloride by suspension, emulsion, or solution methods. It is often copolymerized with up to 50% other compatible monomers. PVC is processed by several methods including blow molding, extrusion, calendering, and coating. Plastisols comprising PVC resin particles dispersed in a liquid phase of a PVC plasticizer are used to produce coatings and molded products. PVC is resistant to weathering, moisture, most acids, fats, petroleum hydrocarbons and fungi. It is dimensionally stable, and has good dielectric properties. It is used for piping and conduits, containers, liners, and flooring.

U.S. Pat. Nos. 2,898,312 and 3,644,229 exemplify compositions and methods for producing polyvinyl chloride/polyurethane hybrid foams. The compositions comprise a polyvinyl chloride resin dispersed in a plasticizer (plastisol), water, a polyol, and a polyisocyanate. The method disclosed in these patents comprises blending a major amount of a polyvinyl chloride plastisol with a minor amount of a polyol, mixing the resulting mixture with a polyisocyanate, and then placing the three part mixture in a suitable mold. The disclosed compositions and methods are said to result in a foamed, cellular material. Processing requirements limit the useful polyether polyols to those with molecular weights between about 500 and about 3,000.

SUMMARY OF THE INVENTION

The present invention is based on the discovery that microcellular polyurethane foams reinforced with and produced by the effect of particulate polyvinyl chloride fillers may be molded to produce structural elements having a variety of shapes, densities, and tensile or compressive strengths. The foams of the invention comprise a polyol, a polyisocyanate, and particles of polyvinyl chloride homopolymer or copolymer resin.

As used herein, the phrase polyvinyl chloride, or the acronym PVC, refer to vinyl chloride homopolymers and copolymers comprising no more than about 50% by weight of a different type of compatible monomer. PVC particles useful in the invention are blending grade or dispersion grade solid particles having an irregular surface. During formation of the foam the PVC particles provide seed bubble sites within the reaction mixture which serve to promote the production of a large number of cells per unit volume. The particles also constitute a reinforcing filler integral with the continuous polyurethane polymer phase constituting the foam structure. The finished product has a uniform, microcellular structure which exhibits isotropic properties.

The formulator can vary the density and rigidity or flexibility of the material using principles known to those skilled in the art of formulating polyurethane foams. Using the techniques disclosed herein one can produce molded structural elements which simulate the density and many of the structural properties of various types of hard and soft woods.

The invention features polymeric materials, compositions for producing the polymeric materials, and methods of manufacturing structure elements made from the materials.

According to the invention, the foamable polymeric material comprises a major amount, e.g., about 100 parts by weight, polyurethane, which forms the continuous phase, and a minor amount, e.g., between about 10 and about 50 parts, preferably about 15 to about 40 parts, dispersed polyvinyl chloride particles. The continuous phase defines cells uniformly no greater than about one millimeter, and preferably no greater than about 0.1 millimeter in mean diameter. The polyvinyl chloride particles preferably range in average size from about 5 to about 50 microns.

The material may have a surface layer integral with the continuous phase which consists essentially of an unexpanded continuous phase of polyurethane having polyvinyl chloride particles dispersed therein. Apart from these surface regions, the materials have a uniform density, typically between approximately 20 to 50 pounds per cubic foot (320 to 800 kilograms per cubic meter).

The polyurethane consists of the reaction product of a multifunctional isocyanate and a polyol. Presently, the preferred multifunctional isocyanate is diphenylmethane diisocyanate; the preferred polyols are polyether polyols. Other isocyanates and polyols may be used.

The invention provides structural elements such as dimensioned stock simulating lumber and molded shapes designed specifically as a substitute for a wood frame or the like having a predetermined density, tensile strength, and compressive strength. To produce such elements, one includes between about 10 to about 50 parts polyvinyl chloride particles per 100 parts polyurethane prepolymer composition. The prepolymer composition comprises a polyol, a multifunctional isocyanate, and a blowing agent, in relative amounts sufficient to form a continuous phase of polyurethane. The polyvinyl chloride particles are dispersed substantially uniformly throughout the urethane precursors in a mold.

As the foam polymerizes, gases, produced by the reaction of the blowing agent and isocyanate, or volatilization of the blowing agent, accumulate at seed bubble sites located on the surface of the polyvinyl chloride particles, and cause the formation of a multiplicity of cells. Typically, the resulting cells are smaller than one millimeter in diameter. Preferably and usually they are smaller than 0.1 mm. A solid, non foamed "skin" can be produced in surface layers of the molding using methods known to formulations of conventional polyurethane compositions.

It is a primary object of the invention to provide a foamed polymeric material having a continuous polyurethane phase and polyvinyl chloride particles dispersed therewithin. It is another object to provide a composition that may be used to produce a polyvinyl chloride-reinforced polyurethane foam having a uniform density, good tensile and compression strength, flexibility, and favorable weathering characteristics. Another object is to provide a composition for producing a polyvinyl chloride-reinforced polyurethane foam for use in a wide range of products and articles, e.g., as a wood substitute. A still further object of the invention is to provide a process for manufacturing foamed polymeric materials in a variety of densities.

These and other objects and features of the invention will be apparent from the following description of the preferred embodiments and from the drawing.

BRIEF DESCRIPTION OF THE DRAWING

The sole figure of the drawing is a schematic drawing illustrating the microstructure of the foam material of the invention.

DESCRIPTION OF THE PREFERRED EMBODIMENTS

The present invention features polymeric hybrid foams useful in fabricating a variety of products, especially where density and high tensile or compression strength are of primary concern. Articles may be fabricated by molding, or by working preformed stock by cutting, drilling, laminating, or the like. The materials may be used to make articles such as furniture or structural or cosmetic building materials. The materials may be substituted for wood in many of its applications.

As shown in the Drawing, the polymeric material 10 of this invention comprises a continuous phase 12 containing uniformly dispersed polyvinyl chloride particles 14. The continuous phase 12 comprises a conventional polyurethane, i.e., the reaction product of a polyol and a multifunctional isocyanate. The cells 16, here depicted as closed cells, contain blowing agent released during production of the foam. The dimensions of the cells preferably are on the order of $10^{-4}$ meter (0.1 mm) and normally should not be greater than $10^{-3}$ meter (1.0 mm). The PVC particles 14 preferably range in size between $5 \times 10^{-6}$ meter and $5 \times 10^{-5}$ meter, i.e., between 5 and 50 micrometers, or approximately between $\frac{1}{4}$ and 1/200 the mean diameter of the cells. These size relationships are achieved in accordance with the invention by controlling the nature, amount, and rate of generation of the blowing agent during production and by selecting PVC particle size.

The PVC particles act as seed bubble sites and thereafter become integral with and reinforce the polyurethane cell walls. The PVC particles preferably comprise dispersion grade or blending grade particles which have a generally spheroidal shape and an irregular surface. Often, the surface contains trace amounts of surfactants used during PVC production. Such particles are available from many commercial sources in the United States and elsewhere. Generally, the material comprises between about 10 and about 50 parts, preferably about 15 to about 40 parts, polyvinyl chloride particles per 100 parts polyurethane.

Polyvinyl chloride resins useful herein are well-known homopolymers having the formula:

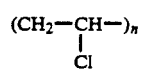

and copolymers rich in vinyl chloride moieties. The polymers are produced by the polymerization of vinyl chloride via suspension, emulsion, or solution methods. They may include up to about 50% by weight of a comonomer such as other vinyls or an acrylate. Alternatively, particles may be purchased commercially from manufacuturers such as Goodyear Tire and Rubber Corp., B.F. Goodrich, Westchem International, and Tenneco, Inc. In the present invention, it is preferred that two grades of polyvinyl chloride particles be utilized. A first grade of particles, a dispersion grade, comprises particles having diameters less than about 15 microns, an inherent viscosity of 1.20, and a specific gravity of 1.4. The second grade, a blending grade, preferably comprises particles having a diameter of about 50 microns and an inherent viscosity of 1.13. Broadly, the invention may utilize mixtures of particles having diameters below about 200 microns. The molecular weight of the PVC may vary widely. PVC's having an average molecular weight within the range of about 80,000 to about 500,000 or higher may be used. Generally, the molecular weight (or inherent viscosity) is not an important factor.

The continuous phase comprises a conventional polyurethane comprising the product of reaction of a multifunctional isocyanate with a polyol.

Useful polyols include polyester or polyether polyols, and may be linear or branched. Flexible foams may be manufactured using polyoxypropylenediols of about 2000 molecular weight and triols up to approximately 4000. Rigid foams may be manufactured using polyethers made from sorbitol, methyl glucoside, or sucrose. The polyether polyol may vary in molecular weight between about 50 and 6000. However, polyols having molecular weights between about 400 and about 3000 are preferred. The desired polyhydroxy compounds have at least 2, and often 3 or more reactive hydroxy groups. The polyols may be substituted with halogens or other moieties for purposes known in the polyurethane art. They may be prepared from known starting materials by known methods, or purchased from many commercial suppliers. Examples of useful polyether polyols are polyether tetrol, glycerol, and propylene oxide polyether triol. As is known, the identity of the polyol can have a significant effect on the mechanical properties of the resulting urethane foam.

Many polyisocyanate compounds reactive with the carboxyl or hydroxyl groups of the polyol also may be used. The preferred isocyanate is a diisocyanate having the formula:

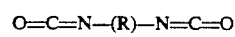

where R is, for example, an alkylene, arylene, aromatic, or aliphatic group, substituted or unsubstituted. The presently preferred diisocyanate is diphenylmethane diisocyanate. This compound has the formula:

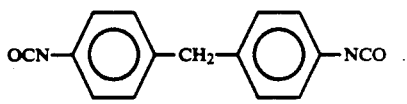

Other non-limiting useful isocyanates include compounds such as: toluene-2,4-diisocyanate, toluene-2,6-diisocyanate; 4,4'-diisocyanate diphenyl methane; 1,5-naphthalene-diisocyanate; cumene-2,4-diisocyanate; 4-methoxy-1,3-phenylene diisocyanate; 4-chloro-1,3-phenylene-diisocyanate; 4-bromo-1,3-phenylene diisocyanate, 4-ethoxy-1,3-phenylene diisocyanate; 5,6-dimethyl-1,3-phenylene diisocyanate; 2,4-dimethyl-1,3-phenylene diisocyanate; 4,4'-diisocyanatodiphenylether; benzidiene diisocyanate; 4,6-dimethyl-3-phenylene diisocyanate; 9,10-anthracene diisocyanate; 1,4-anthracene-diisocyanate; 2,4-fluorenediisocyanate; 1,8-naphthalenediisocyanate; 2,6-diisocyanate benzofuran; and 2,4,6-toluene triisocyanate. It is to be understood that mixtures of two or more of these and other polyisocyanates may be employed. In addition, aromatic isocyanate adducts may be used. Examples of useful adducts include partly prepolymerized mixtures of methylenediisocyanate and polyether polyol.

A preferred blowing agent is water, which reacts with the isocyanate groups during polymerization to produce carbon dioxide gas. Alternatively, a volatile material such as trichlorofluoromethane, or similar compound, may be used. As described above, the gases produced during the polymerization reaction collect at seed bubble or nucleation sites to create the foam's cellular structure.

Surfactants commonly used in the formulation of conventional polyurethane foams also may be included in the formulations disclosed herein. These reduce the surface tension of the liquid urethane mix, thereby tending to enhance cell stability and to promote formation of smaller cells. If a surfactant is employed, conventional silicone fluid surfactants are preferred.

The polymeric material may contain other conventional materials such as colorants, anti-oxidants, flame-retardants, and the like. Anti-oxidants may be added to control polymer degradation in quantities ranging from about 0.15 to about 0.30 parts by weight. Flame-retardants, added in amounts from about 1.0 to about 15 parts by weight, may be added to reduce the hazard of flame of the material of this invention. Flame-retardants such as antimony oxide, tris (2,3)-di-bromo-propl phosphate, tetrabromphotalic anhydride, and ammonium salts of phosphate, pyrophosphate, polyphosphate, sulfate, and the like may be used.

The unique microstructure of the foam, as well as its tensile and compressive strength, are believed to result from the presence of the polyvinyl chloride particles, which serve both functional and structural purposes. Structurally, these particles act to stabilize and reinforce the foam's microcellular continuous phase. Functionally, the irregular surface and residual surfactant often present on the particles serve to restrict uniform interface contact with the urethane prepolymer and to cause the formation of submicron size seed bubble or nucleation sites. At these sites, gases collect which result from the reaction of the blowing agent and isocyanate, or volatilization of the blowing agent itself. As the gas accumulates, bubbles, or cells form in the foam. Accordingly, many small cells are formed (as opposed to fewer, larger cells) having walls reinforced by PVC particles. The effect of stronger walls is manifested by an increase in the material's tensile and compressive strength relative to conventional urethane foams. The ratio of void volume to solids determines density.

It has been discovered that the PVC particles in the particle size range disclosed herein are well entrained in the expanding foam and show little or no tendency to settle. This aspect of the invention is important to its success and contrasts with conventional polyurethane filler materials which have degrading effects on foam properties and a tendency to settle, leading to heterogenous mixtures and non uniform foam properties.

The approach to preparation of materials of the invention is to introduce a foamable prepolymer mixture into a mold and to polymerize in situ. Generally, all ingredients except the isocyanate are blended and thoroughly mixed in a dry atmosphere. Polymerization is initiated by introducing the isocyanate just prior to molding or while the PVC particles, polyol, etc. are disposed in the mold. The flexibility of the urethane matrix is controlled using principles known to skilled urethane formulators involving controlling the molecular weight, functionality, and cross-link density of the product. The density of the material is controlled by varying the quantity and/or identity of the blowing agent and by appropriate catalyst selection.

Where a one-shot injection molding procedure is followed, the resulting structural element desirably may have a "skin", i.e., a surface layer integral with the internal continuous phase. The surface layer consists essentially of an unexpanded continuous phase of polyurethane containing dispersed solid polyvinyl chloride particles. This surface layer is a product of the temperature difference between the foam composition (caused by the exotherm of the reaction) and the mold surfaces, and results from the slower cure of the composition at the mold surface.

The following non-limiting examples provide one skilled in the art an indication of how to make material embodying the invention and illustrate some of its variations.

Each of the following compositions were prepared by dispersing the particulate PVC materials into a preblended liquid phase containing polyol, catalyst, water, and silicone fluid while maintaining temperature below 120 degrees Fahrenheit. Polymerization was initiated by addition of the isocyanate. Mixed material is then poured or injected into the mold cavity. The material rises in approximately two minutes to fill the mold. After five to ten minutes, the molded piece may be removed from the mold.

| Ingredient | Parts by Weight |
| --- | --- |
| A. Rigid Foam | |
| Dispersion grade PVC[1] | 78.2 |
| Blending grade PVC[2] | 51.7 |
| Polyol[3] | 256.7 |
| Silicone fluid[4] | 2.6 |
| Catalyst[5] | 5.1 |
| Water | 0.55 |
| Diphenylmethane diisocyanate mixed with aromatic isocyanate adduct[6] | 605.0 |
| B. Rigid Foam | |
| Dispersion grade PVC[1] | 89.1 |
| Blending grade PVC[2] | 58.9 |
| Polyol[3] | 292.5 |

-continued

| Ingredient | Parts by Weight |
| --- | --- |
| Catalyst[5] | 5.85 |
| Silicone fluid[4] | 2.9 |
| Water | 0.63 |
| Diphenylmethane diisocyanate mixed with polyether polyol - MDI prepolymer[9] | 550.0 |
| C. Flexible Foam | |
| Dispersion grade PVC[1] | 169.2 |
| Blending grade PVC[2] | 112.0 |
| Polyol[10] | 555.7 |
| Catalyst[5] | 11.1 |
| Water | 1.1 |
| Silicone fluid[4] | 5.6 |
| Diphenylmethane diisocyanate mixed with MDI - polyether polyol prepolymer[9] | 145.0 |
| D. Rigid Foam | |
| Polyether polyol[3] | 231.1 |
| Polyol[7] | 115.8 |
| Silicone fluid[4] | 3.5 |
| Catalyst[5] | 6.94 |
| Water | 0.747 |
| Dispersion grade PVC[1] | 105.7 |
| Blending grade PVC[2] | 69.9 |
| Diphenylmethane diisocyanate mixed with MDI polyether polyol prepolymer[9] | 466.0 |
| E. Rigid Foam | |
| Polyether polyol[3] | 301.6 |
| Silicone fluid[4] | 3.23 |
| Catalyst[5] | 5.93 |
| Water | 0.701 |
| Dispersion grade PVC[1] | 91.7 |
| Blending grade PVC[2] | 60.4 |
| Trichlorofluoromethane[8] | 76.0 |
| Diphenylmethane diisocyanate mixed with MDI polyether polyol prepolymer | 460.2 |

[1]Lucky LP-170, (Westchem International), a particulate PVC, inherent viscosity 1.20, specific gravity 1.4, average particle size approximately 5 microns.
[2]Pliovic M-90, (Goodyear), a particulate PVC, inherent viscosity 1.13, average particle size approximately 50 microns.
[3]BASF PEP-450, (BASF Wyandotte) polyether tetrol, hydroxyl number 560, molecular weight 400, specific gravity 1.06, viscosity at 25° C. 2500 CPS.
[4]Niax L-5302 (Union Carbide) polyalkyleneoxidimethyl siloxane copolymer, specific gravity 1.02.
[5]Dabco 33LV (Air Products Co) 33% triethylenediamine, 67 dipropylene glycol, specific gravity 1.03.
[6]Isonate 240 (Dow Chemical Co) isocyanate equivalent weight 225, viscosity at 25° C., 1500 cps, specific gravity 1.21.
[7]Niax 425 (Union Carbide) hydroxyl number 265, molecular weight 425, viscosity at 25° C., 75 cps, specific gravity 1.0056.
[8]Freon 11 (Dupont Chemical Co.), molecular weight 137, boiling point 75° F., specific gravity 1.476, viscosity at 25° C., 0.415 cps.
[9]Isonate 181 (Dow Chemical Co., isocyanate equivalent weight 181, specific gravity 1.21, viscosity at 25° C., 770 cps.
[10]Niax LG-56 (Union Carbide) Glycerol-propylene oxide polyether triol, mw = 3000, hydroxyl number = 56, specific gravity 1.01.

What is claimed is:

1. A foamed rigid polymeric material comprising a continuous phase of polyurethane defining a multiplicity of microcells no greater than about 1 millimeter in diameter, said continuous phase containing integral, substantially uniformly dispersed solid polyvinyl chloride particles having surface features effective to provide a multiplicity of seed bubble sites and serving to stabilize and reinforce said mircocellular structure of said foamed polymeric material to produce a rigid structure approximating the mechanical properties of woods.

2. The material of claim 1 wherein the continuous phase defines cells uniformly no greater than 0.1 millimeter in diameter.

3. The material of claim 1 wherein the polyvinyl chloride particles have an average diameter within the range of 5 microns to 50 microns and an irregular surface.

4. The material of claim 1 further comprising a surface layer integral with said continuous layer and consisting essentially of an unexpanded continuous phase of polyurethane having solid polyvinyl chloride particles dispersed therein.

5. The material of claim 1 comprising 100 parts polyurethane and between 10 and 50 parts polyvinyl chloride particles.

6. The material of claim 5 comprising 100 parts polyurethane and between 15 and 40 parts polyvinyl chloride particles.

7. The material of claim 1 having a density of between 20 pounds per cubic foot and 50 pounds per cubic foot (320 kilograms per cubic meter and 800 kilograms per cubic meter).

8. The material of claim 1 wherein the polyurethane comprises the product of reaction of a diphenylmethane diisocyanate and a polyol.

9. The material of claim 8 wherein the polyol comprises a polyether polyol.

10. A structural element comprising the material of claim 1.

11. A composition for producing a rigid microcellular polyvinylchloride-reinforced polyurethane foam consisting essentially of:
    100 parts of a foamable polyurethane prepolymer mixture including a polyol, a multifunctional isocyanate and a blowing agent in relative amounts sufficient to produce a polyurethane foam polymer; and
    10 to 50 parts of polyvinylchloride particles having a particle size range below about 200 microns, and having surface features effective to provide a multiplicity of seed bubble sites, the relative amounts of the polyurethane prepolymer mixture, blowing agent and particles being sufficient to produce upon reaction a rigid microcellular foam structure which approximates the mechanical properties of wood.

12. The composition of claim 11 comprising between 15 and 40 parts polyvinyl chloride particles.

13. The composition of claim 11 wherein the polyvinyl chloride particles range in size between 5 and 50 microns.

14. A method of manufacturing a rigid structural element having a predetermined density, tensile strength and compressive strength approximating those of wood comprising:
    providing a composition comprising:
    100 parts of a foamable polyurethane prepolymer mixture comprising a polyol, a multifunctional isocyanate, and a blowing agent in relative amounts sufficient to produce a polyurethane foam polymer, and
    10 to 50 parts of polyvinyl chloride particles having a particle size range below about 200 microns, said particles having surface features effective to provide a multiplicity of seed bubble sites;
    introducing the composition into a mold defining the shape of the structural element, and
    reacting the polyol and the multifunctional isocyanate in the presence of the blowing agent and the polyvinyl chloride particles to fill the mold with a continuous phase of rigid polyurethane defining a multiplicity of cells produced at said seed bubble sites, smaller than about 1 millimeter in diameter, and containing said solid polyvinyl chloride particles dispersed substantially uniformly throughout the continuous phase, said continuous phase having an integral surface layer consisting essentially of an unexpanded continuous phase of polyurethane having said polyvinyl chloride particles dispersed therein.

15. The material of claim 1 wherein said polyvinyl chloride particles comprise a first subset of blending grade particles and a different, second subset of dispersion grade particles.

16. The material of claim 11 wherein said polyvinyl chloride particles comprise a first subset of blending grade particles and a different, second subset of dispersion grade particles.

17. The method of claim 14 further comprising the step of providing polyvinyl chloride particles comprising a first subset of blending grade particles and a different, second subset of dispersion grade particles.

18. A foamed rigid polymeric material comprising:

a. a continuous phase of polyurethane defining a multiplicity of microcells having a diameter of about 1 millimeter or less, wherein the polyurethane is the product of a reaction between methylene diisocyante and a polyol; and b. solid polyvinylchloride particles substantially uniformly dispersed in the continuous phase, wherein the particles have surface features effective to provide a multiplicity of seed bubble sites and which serve to stabilize and reinforce the microcellular structure of the foamed polymeric material.

19. The material of claim 18 wherein the continuous phase defines cells uniformly no greater than 0.1 millimeter in diameter.

20. The material of claim 18 wherein the polyvinyl chloride particles have an average diameter within the range of about 5 microns to about 50 microns.

21. The material of claim 18 wherein the polyol comprises a polyether polyol.

* * * * *